US012582029B2

(12) United States Patent
Cholst et al.

(10) Patent No.: US 12,582,029 B2
(45) Date of Patent: Mar. 24, 2026

(54) STRING TRIMMER HEAD

(71) Applicant: MILWAUKEE ELECTRIC TOOL CORPORATION, Brookfield, WI (US)

(72) Inventors: Beth E. Cholst, Wauwatosa, WI (US); Troy C. Thorson, Cedarburg, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 447 days.

(21) Appl. No.: 17/855,113

(22) Filed: Jun. 30, 2022

(65) Prior Publication Data

US 2023/0000010 A1 Jan. 5, 2023

Related U.S. Application Data

(60) Provisional application No. 63/241,197, filed on Sep. 7, 2021, provisional application No. 63/216,817, filed on Jun. 30, 2021.

(51) Int. Cl.
*A01D 34/416* (2006.01)

(52) U.S. Cl.
CPC ..... *A01D 34/4166* (2013.01); *A01D 34/4167* (2013.01)

(58) Field of Classification Search
CPC ............ A01D 34/4166; A01D 34/4167; A01D 34/412; A01D 34/416; A01D 34/4161; A01D 34/4162; A01D 34/4163; A01D 34/4165; A01D 34/90
USPC .............................................. 30/276; 56/12.7
See application file for complete search history.

(56) References Cited

U.S. PATENT DOCUMENTS

| | | | |
|---|---|---|---|
| 1,688,914 | A | 10/1928 | Ariens |
| 1,911,623 | A | 5/1933 | Karl |
| 2,020,524 | A | 11/1935 | Smithburn |
| 2,022,335 | A | 11/1935 | Bernthal |
| 2,131,324 | A | 9/1938 | Hull |
| 2,188,644 | A | 1/1940 | Short |
| D130,494 | S | 11/1941 | Schmeiser |
| 2,290,575 | A | 7/1942 | Potter |
| D137,446 | S | 3/1944 | Schmeiser |
| D138,712 | S | 9/1944 | Karl |
| 2,366,624 | A | 1/1945 | Kelsey |
| 2,366,625 | A | 1/1945 | Kelsey |

(Continued)

FOREIGN PATENT DOCUMENTS

| | | |
|---|---|---|
| CN | 2862622 Y | 1/2007 |
| CN | 100396170 C | 6/2008 |

(Continued)

OTHER PUBLICATIONS

Ego, "Power+ 9.5" Cultivator Attachment," <https://egopowerplus.com/multi-head-cultivator-attachment/> web page visited May 2, 2022.

(Continued)

*Primary Examiner* — Phong H Nguyen
(74) *Attorney, Agent, or Firm* — Dority & Manning, P.A.

(57) ABSTRACT

A trimmer head for use with a string trimmer including a drive shaft includes a housing rotatable about a rotational axis. The housing includes a main body defining a cavity, and a cap removably coupled to the main body. The trimmer head further includes a spool supported in the cavity and operable to support line to be dispensed, a retainer positioned between the housing and the spool, and a nut positioned within the spool and configured to drivingly couple to the drive shaft.

19 Claims, 5 Drawing Sheets

(56)  References Cited

U.S. PATENT DOCUMENTS

| | | | |
|---|---|---|---|
| 2,388,553 A | 11/1945 | Kraus | |
| 2,430,148 A | 11/1947 | Traver | |
| 2,438,707 A | 3/1948 | Kropp | |
| 2,455,147 A | 11/1948 | Traver | |
| 2,455,148 A | 11/1948 | Traver | |
| 2,491,892 A | 12/1949 | Claus | |
| 2,501,364 A | 3/1950 | Traver | |
| 2,551,132 A | 5/1951 | Jacobus | |
| 2,560,359 A | 7/1951 | McCardell | |
| 2,575,223 A | 11/1951 | Madill | |
| 2,593,065 A | 4/1952 | Simon | |
| 2,595,537 A | 5/1952 | Elmer | |
| 2,603,139 A | 7/1952 | Johnson | |
| 2,614,375 A | 10/1952 | Calkins | |
| 2,614,474 A | 10/1952 | Merry | |
| 2,634,666 A | 4/1953 | Merry | |
| 2,679,794 A | 6/1954 | Ober | |
| 2,683,406 A | 7/1954 | Kelsey | |
| 2,684,022 A | 7/1954 | Smithburn | |
| 2,691,933 A | 10/1954 | Emerson | |
| 2,748,683 A | 6/1956 | Milan | |
| 2,751,833 A | 6/1956 | Glynn | |
| 2,762,073 A | 9/1956 | Lombardi | |
| 2,796,819 A | 6/1957 | Arvid | |
| 2,803,183 A | 8/1957 | Smithburn | |
| 2,812,701 A | 11/1957 | Weaver, Jr. | |
| 2,816,495 A | 12/1957 | Brooks | |
| 2,832,184 A | 4/1958 | Beuerle | |
| 2,835,182 A | 5/1958 | Smithburn | |
| 2,847,922 A | 8/1958 | Stephenson | |
| 2,847,924 A | 8/1958 | Quick | |
| 2,888,994 A | 6/1959 | Hoff et al. | |
| 2,903,077 A | 9/1959 | Igor | |
| 3,151,685 A | 10/1964 | Field | |
| 3,173,498 A | 3/1965 | Harold | |
| 3,203,487 A | 8/1965 | Whitesides | |
| 3,212,585 A | 10/1965 | Bezzerides | |
| 3,213,514 A | 10/1965 | James | |
| 3,233,685 A | 2/1966 | Brewer | |
| 3,233,686 A | 2/1966 | Steadman | |
| 3,306,371 A | 2/1967 | Bush | |
| 3,362,482 A | 1/1968 | Riddle | |
| 3,375,879 A | 4/1968 | Troyer et al. | |
| 3,397,748 A | 8/1968 | Whitesides | |
| 3,435,904 A | 4/1969 | Rice | |
| 3,442,335 A | 5/1969 | Silbereis et al. | |
| D221,461 S | 8/1971 | Hagenstad | |
| 3,605,907 A | 9/1971 | Schuring et al. | |
| 3,664,102 A | 5/1972 | Reber | |
| 3,698,485 A | 10/1972 | Trimpe et al. | |
| 3,702,638 A | 11/1972 | Takata | |
| D225,551 S | 12/1972 | Moore | |
| D225,553 S | 12/1972 | Moore | |
| 3,734,201 A | 5/1973 | Zaun | |
| 3,755,845 A | 9/1973 | Coult | |
| 3,760,884 A | 9/1973 | Webster et al. | |
| 3,781,991 A | 1/1974 | Stretton et al. | |
| 3,868,741 A | 3/1975 | Coult | |
| 3,892,278 A | 7/1975 | Smith et al. | |
| 4,006,528 A | 2/1977 | Katsuya | |
| 4,007,525 A | 2/1977 | Utter | |
| 4,043,399 A | 8/1977 | Morrison | |
| 4,043,404 A | 8/1977 | Sorlie et al. | |
| 4,044,841 A | 8/1977 | Smith et al. | |
| 4,047,299 A | 9/1977 | Bair | |
| 4,047,576 A | 9/1977 | Rau et al. | |
| 4,049,059 A | 9/1977 | Weibling | |
| 4,062,408 A | 12/1977 | Enters et al. | |
| 4,068,377 A | 1/1978 | Kimmel et al. | |
| D247,567 S | 3/1978 | Haataja | |
| 4,094,363 A | 6/1978 | McCoomb | |
| 4,095,338 A | 6/1978 | Naohiko et al. | |
| 4,097,991 A | 7/1978 | Proulx | |
| 4,098,349 A | 7/1978 | Jilani | |
| 4,100,971 A | 7/1978 | Honnold | |
| 4,113,027 A | 9/1978 | Van Der | |
| 4,118,132 A | 10/1978 | Dobberpuhl | |
| 4,133,390 A | 1/1979 | Reaume | |
| 4,151,646 A | 5/1979 | Lane | |
| 4,151,883 A | 5/1979 | Van Der et al. | |
| 4,161,820 A | 7/1979 | Moore | |
| 4,167,812 A | 9/1979 | Moore | |
| 4,168,572 A | 9/1979 | Ewing | |
| 4,183,138 A | 1/1980 | Mitchell et al. | |
| 4,189,830 A | 2/1980 | Pittinger, Jr. | |
| 4,189,833 A | 2/1980 | Kwater | |
| 4,195,408 A | 4/1980 | Palmieri et al. | |
| 4,214,632 A | 7/1980 | Brookshier | |
| 4,236,311 A | 12/1980 | Mitchell | |
| 4,237,610 A | 12/1980 | Bradus et al. | |
| 4,250,621 A | 2/1981 | Houle | |
| 4,250,622 A | 2/1981 | Houle | |
| 4,253,238 A | 3/1981 | Sheldon | |
| 4,256,183 A | 3/1981 | Hanley | |
| 4,258,635 A | 3/1981 | Lutz et al. | |
| 4,267,891 A | 5/1981 | Van Der et al. | |
| 4,269,372 A | 5/1981 | Kwater | |
| 4,271,595 A | 6/1981 | Rahe | |
| 4,274,201 A | 6/1981 | Oberg et al. | |
| 4,276,940 A | 7/1981 | Kirkegaard | |
| 4,278,133 A | 7/1981 | De Marcellus | |
| 4,290,488 A | 9/1981 | Pelsy | |
| 4,307,479 A | 12/1981 | Mertes et al. | |
| 4,346,764 A | 8/1982 | Rossi | |
| 4,349,962 A | 9/1982 | Itagaki et al. | |
| 4,362,074 A | 12/1982 | Kwater | |
| 4,364,437 A | 12/1982 | Haapala | |
| 4,372,397 A | 2/1983 | Goertzen et al. | |
| 4,373,590 A | 2/1983 | Wittrock | |
| 4,398,606 A | 8/1983 | Herscher | |
| 4,398,608 A | 8/1983 | Boetto | |
| 4,402,365 A | 9/1983 | Goertzen | |
| 4,411,322 A | 10/1983 | Linger | |
| 4,412,382 A | 11/1983 | White, III | |
| 4,412,588 A | 11/1983 | Van Der et al. | |
| 4,415,041 A | 11/1983 | Fackler | |
| 4,421,176 A | 12/1983 | Tuggle et al. | |
| 4,421,178 A | 12/1983 | Vandelli et al. | |
| 4,424,869 A | 1/1984 | Vom Braucke et al. | |
| 4,426,780 A | 1/1984 | Foster | |
| 4,458,419 A | 7/1984 | Proulx | |
| 4,467,874 A | 8/1984 | Wittrock | |
| 4,490,910 A | 1/1985 | Mattson et al. | |
| 4,492,271 A | 1/1985 | Doering | |
| 4,515,222 A | 5/1985 | Van Der | |
| 4,524,515 A | 6/1985 | Oberg | |
| 4,561,180 A | 12/1985 | Pittinger, Sr. et al. | |
| 4,611,669 A | 9/1986 | Ballard | |
| 4,629,007 A | 12/1986 | Pegoraro | |
| 4,633,588 A | 1/1987 | Pittinger, Jr. | |
| 4,646,850 A | 3/1987 | Brown et al. | |
| 4,656,739 A | 4/1987 | Pittinger, Jr. | |
| 4,658,910 A | 4/1987 | Garriss | |
| 4,660,286 A | 4/1987 | Engelbrecht et al. | |
| 4,672,798 A | 6/1987 | Ota | |
| 4,678,043 A | 7/1987 | Vom Braucke et al. | |
| 4,702,005 A | 10/1987 | Pittinger, Sr. et al. | |
| 4,706,761 A | 11/1987 | Herscher et al. | |
| D293,342 S | 12/1987 | Thomson et al. | |
| 4,736,573 A | 4/1988 | Seck et al. | |
| 4,744,148 A | 5/1988 | Brown | |
| 4,776,290 A | 10/1988 | Rau et al. | |
| 4,776,405 A | 10/1988 | Grieder et al. | |
| D300,141 S | 3/1989 | Kawashima | |
| 4,817,732 A | 4/1989 | Brown | |
| 4,871,031 A | 10/1989 | Kestel | |
| 4,882,843 A | 11/1989 | Baba | |
| 4,888,871 A | 12/1989 | Engelbrecht | |
| 4,942,664 A | 7/1990 | Zatulovsky | |
| 5,010,720 A | 4/1991 | Corsi | |
| 5,025,615 A | 6/1991 | Hawkenson | |
| 5,029,361 A | 7/1991 | Murata et al. | |
| 5,033,259 A | 7/1991 | Adcock | |
| 5,048,616 A | 9/1991 | Hoff | |

(56) References Cited

U.S. PATENT DOCUMENTS

| | | | |
|---|---|---|---|
| 5,056,181 A | 10/1991 | Tsuchiya et al. |
| 5,063,673 A | 11/1991 | Webster |
| 5,063,731 A | 11/1991 | Hull et al. |
| 5,082,063 A | 1/1992 | Sidders |
| 5,109,976 A | 5/1992 | Mohri et al. |
| 5,136,782 A | 8/1992 | Calcinai |
| 5,148,569 A | 9/1992 | Jailor et al. |
| 5,158,145 A | 10/1992 | Karchewski |
| 5,159,845 A | 11/1992 | Wada et al. |
| 5,224,553 A | 7/1993 | Heintzman |
| 5,267,517 A | 12/1993 | Jones |
| 5,299,647 A | 4/1994 | Mudd et al. |
| 5,339,526 A | 8/1994 | Everts |
| 5,351,565 A | 10/1994 | Wada et al. |
| 5,361,570 A | 11/1994 | Bernardy |
| 5,375,284 A | 12/1994 | Deimel et al. |
| 5,394,612 A | 3/1995 | Wolfington |
| 5,443,023 A | 8/1995 | Carroll |
| 5,507,351 A | 4/1996 | Martin |
| 5,524,349 A | 6/1996 | Dolin |
| 5,645,000 A | 7/1997 | Carroll |
| 5,662,173 A | 9/1997 | Blesing |
| 5,765,287 A | 6/1998 | Griffini et al. |
| 5,806,294 A | 9/1998 | Strieber |
| 5,810,093 A | 9/1998 | Howard |
| 5,850,882 A | 12/1998 | Link |
| 5,855,068 A | 1/1999 | Zilly et al. |
| 5,875,700 A | 3/1999 | Powell |
| 5,931,605 A | 8/1999 | Toor et al. |
| 5,950,317 A | 9/1999 | Yates et al. |
| 5,960,889 A | 10/1999 | Mclaren |
| 5,996,234 A | 12/1999 | Fowler et al. |
| 6,017,169 A | 1/2000 | Toor et al. |
| D421,026 S | 2/2000 | Bruns et al. |
| 6,021,630 A | 2/2000 | Higashi et al. |
| 6,052,976 A | 4/2000 | Cellini et al. |
| 6,065,214 A | 5/2000 | Nagashima |
| 6,167,973 B1 | 1/2001 | Nagashima |
| 6,272,756 B1 | 8/2001 | Peterson et al. |
| 6,293,349 B1 | 9/2001 | Marshall et al. |
| 6,311,398 B1 | 11/2001 | Peterson et al. |
| 6,364,030 B1 | 4/2002 | Pfeiffer et al. |
| 6,367,561 B1 | 4/2002 | Firdaus |
| 6,422,194 B2 | 7/2002 | Ito et al. |
| 6,446,346 B1 | 9/2002 | Castleman |
| D467,944 S | 12/2002 | Stark |
| 6,487,780 B1 | 12/2002 | Peterson et al. |
| 6,488,101 B1 | 12/2002 | Miyahara et al. |
| 6,494,176 B2 | 12/2002 | Ito et al. |
| 6,497,044 B2 | 12/2002 | Yamane et al. |
| D469,447 S | 1/2003 | Stark |
| 6,505,596 B2 | 1/2003 | Ito et al. |
| 6,508,224 B2 | 1/2003 | Ito et al. |
| 6,519,857 B1 | 2/2003 | Proulx et al. |
| 6,523,618 B2 | 2/2003 | Firdaus |
| 6,540,031 B1 | 4/2003 | Sasaoka |
| 6,578,270 B2 | 6/2003 | Hiratsuna et al. |
| 6,594,907 B2 | 7/2003 | Wilson et al. |
| 6,612,376 B2 | 9/2003 | Sergyeyenko et al. |
| 6,640,449 B1 | 11/2003 | Hoffmann et al. |
| 6,644,416 B2 | 11/2003 | Teeple |
| 6,666,009 B1 | 12/2003 | Brandon |
| 6,672,273 B2 | 1/2004 | Ito et al. |
| 6,705,263 B2 | 3/2004 | Ito et al. |
| 6,708,774 B2 | 3/2004 | Miyahara et al. |
| 6,722,041 B2 | 4/2004 | Warashina et al. |
| 6,739,058 B2 | 5/2004 | Warashina et al. |
| 6,739,403 B2 | 5/2004 | Firdaus |
| 6,754,962 B2 | 6/2004 | Warashina et al. |
| 6,754,963 B2 | 6/2004 | Warashina et al. |
| 6,754,964 B2 | 6/2004 | Sugihara et al. |
| 6,757,980 B2 | 7/2004 | Arsenault |
| 6,766,866 B2 | 7/2004 | Miyahara et al. |
| 6,779,274 B2 | 8/2004 | Peterson et al. |
| 6,782,863 B2 | 8/2004 | Leasure et al. |
| 6,810,849 B1 | 11/2004 | Hirsch et al. |
| 6,823,947 B2 | 11/2004 | Nagaoka et al. |
| 6,834,633 B2 | 12/2004 | Sing et al. |
| 6,854,525 B2 | 2/2005 | Martindale |
| D503,938 S | 4/2005 | Vasilescu |
| 6,904,977 B2 | 6/2005 | Zerrer et al. |
| 6,926,090 B2 | 8/2005 | Sergyeyenko et al. |
| 6,926,091 B2 | 8/2005 | Lee |
| 6,938,587 B2 | 9/2005 | Thomas et al. |
| 6,944,954 B1 | 9/2005 | Arnetoli |
| 6,952,877 B2 | 10/2005 | Pfaltzgraff |
| 6,997,812 B2 | 2/2006 | Sasaki et al. |
| 7,000,324 B2 | 2/2006 | Fogle |
| 7,017,272 B2 | 3/2006 | Grace |
| D518,831 S | 4/2006 | Bowsher |
| D519,526 S | 4/2006 | Bowsher |
| D523,028 S | 6/2006 | Fitzpatrick |
| 7,059,106 B2 | 6/2006 | Brandon |
| 7,096,966 B2 | 8/2006 | Eberhardt et al. |
| 7,171,723 B2 | 2/2007 | Kobayashi et al. |
| 7,171,798 B1 | 2/2007 | Bernardy |
| 7,251,857 B2 | 8/2007 | Caruso |
| 7,275,324 B2 | 10/2007 | Proulx |
| 7,302,790 B2 | 12/2007 | Brandon |
| 7,303,025 B2 | 12/2007 | Mayer |
| 7,395,601 B2 | 7/2008 | Berfield |
| 7,412,768 B2 | 8/2008 | Alliss |
| 7,480,998 B2 | 1/2009 | Suzuki et al. |
| 7,484,568 B2 | 2/2009 | Vasilescu |
| 7,513,046 B2 | 4/2009 | Proulx |
| D598,255 S | 8/2009 | Alliss |
| 7,575,066 B2 | 8/2009 | Bauer |
| 7,581,322 B2 | 9/2009 | Proulx |
| 7,594,334 B2 | 9/2009 | Kocha |
| 7,607,232 B2 | 10/2009 | Pfaltzgraff |
| D607,017 S | 12/2009 | Fraley et al. |
| 7,624,814 B2 | 12/2009 | Skolness |
| 7,640,668 B2 | 1/2010 | Iacona |
| 7,640,995 B2 | 1/2010 | Knobloch |
| 7,661,252 B2 | 2/2010 | Kitamura |
| D611,507 S | 3/2010 | Martin |
| 7,753,133 B2 | 7/2010 | Skolness |
| 7,762,002 B2 | 7/2010 | Proulx |
| 7,797,839 B2 | 9/2010 | Proulx |
| 7,814,984 B1 | 10/2010 | Fraley et al. |
| 7,878,260 B2 | 2/2011 | Notaras et al. |
| 7,882,642 B2 | 2/2011 | Proulx |
| 7,963,344 B2 | 6/2011 | Marcil et al. |
| 7,979,991 B2 | 7/2011 | Pfaltzgraff |
| 7,984,573 B2 | 7/2011 | Lau |
| 8,001,694 B2 | 8/2011 | Sing et al. |
| 8,025,249 B2 | 9/2011 | Alliss et al. |
| 8,122,554 B2 | 2/2012 | Schemmel et al. |
| 8,162,072 B2 | 4/2012 | Marcil et al. |
| 8,181,711 B1 | 5/2012 | Fraley et al. |
| 8,186,450 B2 | 5/2012 | Bauer |
| 8,210,272 B2 | 7/2012 | Notaras et al. |
| 8,230,602 B2 | 7/2012 | Arnetoli |
| 8,261,846 B2 | 9/2012 | Fraley et al. |
| 8,266,805 B1 | 9/2012 | Alliss |
| 8,297,034 B1 | 10/2012 | Mueller |
| 8,327,947 B2 | 12/2012 | Martindale et al. |
| 8,347,443 B1 | 1/2013 | Conrad |
| 8,429,886 B2 | 4/2013 | Kato et al. |
| 8,434,563 B2 | 5/2013 | Gendelman et al. |
| 8,464,431 B2 | 6/2013 | Reynolds et al. |
| 8,496,069 B2 | 7/2013 | Gendelman et al. |
| 8,496,071 B2 | 7/2013 | Fraley et al. |
| 8,510,960 B2 | 8/2013 | Pfaltzgraff et al. |
| D690,063 S | 9/2013 | Kent et al. |
| 8,549,827 B2 | 10/2013 | Kato et al. |
| 8,567,073 B2 | 10/2013 | Proulx |
| 8,567,074 B2 | 10/2013 | Arnetoli |
| 8,568,051 B2 | 10/2013 | Burnett |
| 8,607,889 B2 | 12/2013 | Marcil et al. |
| 8,615,887 B2 | 12/2013 | Arnetoli |
| 8,627,897 B2 | 1/2014 | Marcil et al. |
| 8,627,898 B2 | 1/2014 | Nance |
| 8,701,621 B2 | 4/2014 | Takeda et al. |

(56)            References Cited

U.S. PATENT DOCUMENTS

| | | | |
|---|---|---|---|
| 8,707,567 B2 | 4/2014 | Proulx |
| 8,745,879 B2 | 6/2014 | Alliss |
| 8,745,880 B2 | 6/2014 | Kato |
| 8,776,910 B1 | 7/2014 | Dallas et al. |
| D718,345 S | 11/2014 | Whalen |
| 8,910,387 B2 | 12/2014 | Alliss |
| 8,910,388 B2 | 12/2014 | Proulx |
| 8,915,219 B2 | 12/2014 | Nakamura et al. |
| 8,918,999 B2 | 12/2014 | Proulx et al. |
| 8,928,201 B2 | 1/2015 | Tanimoto et al. |
| 8,991,514 B2 | 3/2015 | Tozawa et al. |
| 9,041,320 B2 | 5/2015 | Untermann et al. |
| 9,049,816 B2 | 6/2015 | Ito et al. |
| 9,095,098 B2 | 8/2015 | Guenther et al. |
| 9,144,194 B2 | 9/2015 | Kato |
| 9,160,211 B2 | 10/2015 | Tanimoto et al. |
| 9,167,737 B2 | 10/2015 | McGowen |
| D745,759 S | 12/2015 | Kent et al. |
| 9,204,588 B1 | 12/2015 | Christie et al. |
| 9,224,995 B2 | 12/2015 | Martinsson et al. |
| 9,271,442 B2 | 3/2016 | Pellenc |
| 9,277,687 B2 | 3/2016 | Marcil et al. |
| 9,290,905 B1 | 3/2016 | Diaz et al. |
| 9,295,195 B2 | 3/2016 | Proulx et al. |
| 9,307,687 B2 | 4/2016 | Ruppel et al. |
| 9,320,189 B2 | 4/2016 | Nance |
| 9,322,344 B2 | 4/2016 | Isono et al. |
| 9,345,193 B2 | 5/2016 | Wu |
| 9,357,712 B2 | 6/2016 | Pickett et al. |
| 9,363,946 B2 | 6/2016 | Pellenc |
| 9,366,220 B2 | 6/2016 | Leufen et al. |
| 9,380,743 B2 | 7/2016 | Alliss |
| 9,392,737 B2 | 7/2016 | Sanderson |
| 9,439,339 B2 | 9/2016 | Hurd |
| 9,447,827 B2 | 9/2016 | Yuasa |
| 9,456,723 B2 | 10/2016 | Thorne et al. |
| 9,468,143 B2 | 10/2016 | Stark |
| 9,496,809 B2 | 11/2016 | Nakano et al. |
| 9,516,799 B2 | 12/2016 | Olsen |
| 9,516,807 B2 | 12/2016 | Alliss |
| 9,526,389 B2 | 12/2016 | Thorne et al. |
| 9,655,486 B2 | 5/2017 | Xu et al. |
| 9,670,837 B2 | 6/2017 | Honzawa et al. |
| 9,730,371 B2 | 8/2017 | Ruppel et al. |
| 9,736,974 B2 | 8/2017 | Hurd |
| D796,559 S | 9/2017 | Bruce |
| 9,752,630 B2 | 9/2017 | Yuasa |
| 9,756,783 B2 | 9/2017 | Nojiri et al. |
| 9,763,372 B2 | 9/2017 | Modzik et al. |
| 9,782,884 B2 | 10/2017 | Ota et al. |
| 9,826,679 B2 | 11/2017 | Lang et al. |
| 9,839,172 B2 | 12/2017 | Meier et al. |
| 9,844,189 B2 | 12/2017 | Baker |
| 9,844,307 B2 | 12/2017 | Muir |
| 9,854,738 B2 | 1/2018 | Miller et al. |
| 9,861,033 B2 | 1/2018 | Skinner et al. |
| 9,872,429 B2 | 1/2018 | Ma et al. |
| 9,877,435 B2 | 1/2018 | Li et al. |
| 9,907,234 B2 | 3/2018 | Poole et al. |
| 9,924,631 B2 | 3/2018 | Alliss |
| 9,955,627 B2 | 5/2018 | Nakano et al. |
| 9,955,832 B2 | 5/2018 | Thorne et al. |
| D825,293 S | 8/2018 | Alliss |
| 10,051,772 B2 | 8/2018 | Freed et al. |
| 10,064,329 B1 | 9/2018 | Lovmark |
| 10,105,832 B2 | 10/2018 | Martinsson et al. |
| 10,130,030 B2 | 11/2018 | Sprungman et al. |
| 10,149,433 B2 | 12/2018 | Wyne |
| 10,159,171 B1 | 12/2018 | Christie et al. |
| D838,811 S | 1/2019 | Kornblum |
| 10,226,157 B2 | 3/2019 | Xu et al. |
| 10,247,165 B2 | 4/2019 | Eto et al. |
| 10,264,725 B2 | 4/2019 | Guo et al. |
| 10,273,112 B2 | 4/2019 | Alliss |
| 10,278,321 B2 | 5/2019 | Parkey |
| 10,299,430 B2 | 5/2019 | Miller et al. |
| 10,314,228 B2 | 6/2019 | Ma et al. |
| 10,314,229 B2 | 6/2019 | Arnetoli |
| 10,327,381 B2 | 6/2019 | Arnetoli |
| 10,334,778 B2 | 7/2019 | Kullberg |
| 10,334,779 B2 | 7/2019 | Kågebäck et al. |
| 10,350,743 B2 | 7/2019 | Fu et al. |
| 10,362,721 B2 | 7/2019 | Hurd |
| 10,371,044 B2 | 8/2019 | Karrar |
| 10,390,471 B2 | 8/2019 | Bruce |
| 10,398,071 B2 | 9/2019 | Ruppel et al. |
| 10,433,491 B2 | 10/2019 | Li et al. |
| 10,439,415 B2 | 10/2019 | Zhu et al. |
| 10,440,882 B2 | 10/2019 | Guo et al. |
| 10,506,754 B2 | 12/2019 | Christie et al. |
| 10,517,209 B2 | 12/2019 | Kullberg |
| 10,517,210 B2 | 12/2019 | Cabrera |
| 10,517,385 B2 | 12/2019 | Kress |
| 10,537,057 B2 | 1/2020 | Sergyeyenko et al. |
| D878,430 S | 3/2020 | Bruce |
| D878,431 S | 3/2020 | Bruce |
| 10,575,472 B2 | 3/2020 | Baker |
| 10,638,666 B2 | 5/2020 | Fu |
| 10,645,878 B2 | 5/2020 | Zhang et al. |
| 10,645,884 B2 | 5/2020 | Poole et al. |
| RE48,068 E | 6/2020 | Nojiri et al. |
| 10,716,253 B2 | 7/2020 | Zenkus et al. |
| 10,722,023 B2 | 7/2020 | Zhai |
| 10,772,258 B2 | 9/2020 | Sugiyama |
| 10,820,462 B2 | 11/2020 | Christie et al. |
| 10,820,685 B1 | 11/2020 | Becker |
| 10,856,466 B2 | 12/2020 | Guo et al. |
| 2002/0026714 A1 | 3/2002 | Peterson et al. |
| 2002/0073556 A1 | 6/2002 | Fogle |
| 2002/0144408 A1 | 10/2002 | Cho |
| 2002/0189107 A1 | 12/2002 | Arnetoli |
| 2004/0065289 A1 | 4/2004 | Leasure et al. |
| 2004/0123828 A1 | 7/2004 | Sing et al. |
| 2004/0128840 A1 | 7/2004 | Proulx et al. |
| 2004/0148784 A1 | 8/2004 | Grace |
| 2004/0149466 A1 | 8/2004 | Stark |
| 2004/0154276 A1 | 8/2004 | Brandon |
| 2004/0255895 A1 | 12/2004 | Hirsch et al. |
| 2005/0045347 A1 | 3/2005 | Stark et al. |
| 2005/0167125 A1 | 8/2005 | Martindale |
| 2005/0183411 A1 | 8/2005 | Stanley |
| 2005/0252184 A1 | 11/2005 | Craig |
| 2005/0274532 A1 | 12/2005 | Lephart et al. |
| 2006/0053636 A1 | 3/2006 | Fogle |
| 2006/0070753 A1 | 4/2006 | Lephart et al. |
| 2006/0124324 A1 | 6/2006 | Neusink et al. |
| 2006/0191143 A1 | 8/2006 | Brandon |
| 2006/0254061 A1 | 11/2006 | Alliss |
| 2007/0180704 A1 | 8/2007 | Chiu |
| 2007/0180705 A1 | 8/2007 | Chiu |
| 2007/0287571 A1 | 12/2007 | Li |
| 2008/0022484 A1 | 1/2008 | Caruso |
| 2008/0128147 A1 | 6/2008 | Lynch |
| 2008/0201877 A1 | 8/2008 | Sengewald et al. |
| 2008/0236851 A1 | 10/2008 | Winkle |
| 2008/0282554 A1 | 11/2008 | Grace |
| 2009/0044351 A1 | 2/2009 | Menrik et al. |
| 2009/0050341 A1 | 2/2009 | Hathaway et al. |
| 2009/0173053 A1 | 7/2009 | Stanley |
| 2010/0154229 A1 | 6/2010 | Iacona et al. |
| 2010/0186240 A1 | 7/2010 | Waugh |
| 2010/0229403 A1 | 9/2010 | Apfel et al. |
| 2011/0131817 A1 | 6/2011 | Ito |
| 2011/0239468 A1 | 10/2011 | Conlon |
| 2011/0240319 A1 | 10/2011 | Sanderson |
| 2011/0297404 A1 | 12/2011 | Welch |
| 2011/0302791 A1 | 12/2011 | Proulx et al. |
| 2011/0302898 A1 | 12/2011 | Craig |
| 2012/0073258 A1 | 3/2012 | Stanley |
| 2012/0104983 A1 | 5/2012 | Tanimoto et al. |
| 2012/0159792 A1 | 6/2012 | Hoelscher |
| 2012/0198706 A1 | 8/2012 | Yang et al. |
| 2012/0234122 A1 | 9/2012 | Naka |
| 2012/0279743 A1 | 11/2012 | Suda et al. |

(56)    References Cited

U.S. PATENT DOCUMENTS

| | | |
|---|---|---|
| 2013/0014996 A1 | 1/2013 | Ruppel et al. |
| 2013/0049477 A1 | 2/2013 | Tozawa et al. |
| 2013/0133903 A1 | 5/2013 | Lipscomb |
| 2013/0180547 A1 | 7/2013 | Kent et al. |
| 2013/0185946 A1 | 7/2013 | Apfel et al. |
| 2014/0053416 A1 | 2/2014 | Proulx |
| 2014/0083375 A1 | 3/2014 | Kawashima et al. |
| 2014/0345893 A1 | 11/2014 | Christie et al. |
| 2015/0068783 A1 | 3/2015 | Pickett et al. |
| 2015/0075010 A1 | 3/2015 | Proulx |
| 2015/0107120 A1 | 4/2015 | Proulx et al. |
| 2016/0007520 A1 | 1/2016 | McGowen |
| 2016/0021818 A1 | 1/2016 | Salsbery |
| 2016/0106034 A1 | 4/2016 | Arnetoli |
| 2016/0128276 A1 | 5/2016 | Arnetoli |
| 2016/0143218 A1 | 5/2016 | Sergyeyenko et al. |
| 2016/0183452 A1 | 6/2016 | Kullberg |
| 2016/0271783 A1 | 9/2016 | Pickett et al. |
| 2016/0305438 A1 | 10/2016 | Yamamoto et al. |
| 2017/0034984 A1 | 2/2017 | Olsen |
| 2017/0094900 A1 | 4/2017 | Arnetoli |
| 2017/0349394 A1 | 12/2017 | Alliss |
| 2018/0020614 A1 | 1/2018 | Alliss |
| 2018/0020615 A1 | 1/2018 | Alliss |
| 2018/0094393 A1 | 4/2018 | Takahashi et al. |
| 2018/0110182 A1 | 4/2018 | Nolin et al. |
| 2018/0116106 A1 | 5/2018 | Kullberg et al. |
| 2018/0132417 A1 | 5/2018 | Alliss |
| 2018/0168098 A1 | 6/2018 | Alliss |
| 2018/0177122 A1 | 6/2018 | Skinner |
| 2018/0263184 A1 | 9/2018 | Cline |
| 2018/0294656 A1 | 10/2018 | Iwata et al. |
| 2018/0325035 A1 | 11/2018 | Chung et al. |
| 2018/0333753 A1 | 11/2018 | Nolin et al. |
| 2019/0059213 A1 | 2/2019 | Sprungman et al. |
| 2019/0075721 A1 | 3/2019 | Cholst et al. |
| 2019/0109478 A1 | 4/2019 | Zhu et al. |
| 2019/0116714 A1 | 4/2019 | Christie et al. |
| 2019/0116728 A1 | 4/2019 | Zenkus et al. |
| 2019/0185289 A1 | 6/2019 | Alliss |
| 2019/0216013 A1 | 7/2019 | Guo et al. |
| 2019/0261549 A1 | 8/2019 | Christie et al. |
| 2019/0261557 A1 | 8/2019 | Ma et al. |
| 2019/0269289 A1 | 9/2019 | Xu et al. |
| 2019/0274500 A1 | 9/2019 | Thorne et al. |
| 2019/0320865 A1 | 10/2019 | Brown et al. |
| 2019/0341794 A1 | 11/2019 | Zhu et al. |
| 2020/0008348 A1 | 1/2020 | Guo et al. |
| 2020/0029497 A1 | 1/2020 | Guo et al. |
| 2020/0030958 A1 | 1/2020 | Chan |
| 2020/0053940 A1 | 2/2020 | Ruppel et al. |
| 2020/0067337 A1 | 2/2020 | Nakamoto et al. |
| 2020/0079614 A1 | 3/2020 | Cigarini et al. |
| 2020/0113131 A1 | 4/2020 | Arnetoli |
| 2020/0129031 A1 | 4/2020 | Kress |
| 2020/0137965 A1 | 5/2020 | Register |
| 2020/0138179 A1 | 5/2020 | Keiser et al. |
| 2020/0139514 A1 | 5/2020 | Clifford et al. |
| 2020/0196533 A1 | 6/2020 | Wu et al. |
| 2020/0198097 A1 | 6/2020 | Keiser et al. |
| 2020/0212837 A1 | 7/2020 | Ichikawa et al. |
| 2020/0212838 A1 | 7/2020 | Nakamoto et al. |
| 2020/0236845 A1 | 7/2020 | Wang et al. |
| 2020/0236848 A1 | 7/2020 | Guo et al. |
| 2020/0236875 A1 | 7/2020 | Poole et al. |
| 2020/0246998 A1 | 8/2020 | Niiyama |
| 2020/0260643 A1 | 8/2020 | Hata et al. |
| 2020/0267902 A1 | 8/2020 | Zhang et al. |
| 2020/0296888 A1 | 9/2020 | Arnetoli |
| 2020/0315089 A1 | 10/2020 | Racz et al. |
| 2021/0015035 A1 | 1/2021 | Guo et al. |
| 2022/0330479 A1 | 10/2022 | Cholst et al. |
| 2023/0000008 A1 | 1/2023 | Cholst |
| 2023/0000009 A1 | 1/2023 | Cholst |
| 2023/0000011 A1 | 1/2023 | Cholst et al. |

FOREIGN PATENT DOCUMENTS

| | | |
|---|---|---|
| CN | 201222848 Y | 4/2009 |
| CN | 201450714 U | 5/2010 |
| CN | 201541438 U | 8/2010 |
| CN | 201645232 U | 11/2010 |
| CN | 201839620 U | 5/2011 |
| CN | 102349367 A | 2/2012 |
| CN | 102369810 A | 3/2012 |
| CN | 102388688 A | 3/2012 |
| CN | 102396320 A | 4/2012 |
| CN | 202262256 U | 6/2012 |
| CN | 202617619 U | 12/2012 |
| CN | 202818968 U | 3/2013 |
| CN | 202998783 U | 6/2013 |
| CN | 203120459 U | 8/2013 |
| CN | 103299835 A | 9/2013 |
| CN | 203181557 U | 9/2013 |
| CN | 203206734 U | 9/2013 |
| CN | 103404309 A | 11/2013 |
| CN | 203301952 U | 11/2013 |
| CN | 103430687 A | 12/2013 |
| CN | 203435367 U | 2/2014 |
| CN | 203504961 U | 4/2014 |
| CN | 104115609 A | 10/2014 |
| CN | 203934334 U | 11/2014 |
| CN | 204069639 U | 1/2015 |
| CN | 204206729 U | 3/2015 |
| CN | 104663026 A | 6/2015 |
| CN | 104782247 A | 7/2015 |
| CN | 104823538 A | 8/2015 |
| CN | 204560136 U | 8/2015 |
| CN | 103548434 B | 9/2015 |
| CN | 204707415 U | 10/2015 |
| CN | 204724895 U | 10/2015 |
| CN | 105052356 A | 11/2015 |
| CN | 204761980 U | 11/2015 |
| CN | 204948761 U | 1/2016 |
| CN | 105284270 A | 2/2016 |
| CN | 105350707 A | 3/2016 |
| CN | 105393695 A | 3/2016 |
| CN | 105393696 A | 3/2016 |
| CN | 205105540 U | 3/2016 |
| CN | 103286393 B | 4/2016 |
| CN | 105507806 A | 4/2016 |
| CN | 205142981 U | 4/2016 |
| CN | 105594362 A | 5/2016 |
| CN | 205232795 U | 5/2016 |
| CN | 205232798 U | 5/2016 |
| CN | 105794342 A | 7/2016 |
| CN | 205357121 U | 7/2016 |
| CN | 205399324 U | 7/2016 |
| CN | 105874918 A | 8/2016 |
| CN | 105874921 A | 8/2016 |
| CN | 205430100 U | 8/2016 |
| CN | 103404294 B | 9/2016 |
| CN | 106235967 A | 12/2016 |
| CN | 106416464 A | 2/2017 |
| CN | 205961825 U | 2/2017 |
| CN | 206007154 U | 3/2017 |
| CN | 104885608 B | 4/2017 |
| CN | 105493662 B | 6/2017 |
| CN | 206251578 U | 6/2017 |
| CN | 106922226 A | 7/2017 |
| CN | 206423136 U | 8/2017 |
| CN | 206547259 U | 10/2017 |
| CN | 107371404 A | 11/2017 |
| CN | 206658380 U | 11/2017 |
| CN | 206743789 U | 12/2017 |
| CN | 206776065 U | 12/2017 |
| CN | 207040310 U | 2/2018 |
| CN | 105612905 B | 3/2018 |
| CN | 207235369 U | 4/2018 |
| CN | 207382811 U | 5/2018 |
| CN | 105917763 B | 6/2018 |
| CN | 207444904 U | 6/2018 |
| CN | 207505355 U | 6/2018 |
| CN | 108450064 A | 8/2018 |
| CN | 108575123 A | 9/2018 |

(56) References Cited

FOREIGN PATENT DOCUMENTS

| | | | |
|---|---|---|---|
| CN | 207869611 U | 9/2018 |
| CN | 207869613 U | 9/2018 |
| CN | 108901311 A | 11/2018 |
| CN | 208079682 U | 11/2018 |
| CN | 208175262 U | 12/2018 |
| CN | 208227601 U | 12/2018 |
| CN | 106034412 B | 1/2019 |
| CN | 208338368 U | 1/2019 |
| CN | 208353830 U | 1/2019 |
| CN | 208387296 U | 1/2019 |
| CN | 109417934 A | 3/2019 |
| CN | 106941788 B | 4/2019 |
| CN | 208708144 U | 4/2019 |
| CN | 208783289 U | 4/2019 |
| CN | 208987318 U | 6/2019 |
| CN | 208987320 U | 6/2019 |
| CN | 208987321 U | 6/2019 |
| CN | 208987324 U | 6/2019 |
| CN | 209057530 U | 7/2019 |
| CN | 209151588 U | 7/2019 |
| CN | 209170912 U | 7/2019 |
| CN | 209201539 U | 8/2019 |
| CN | 209358935 U | 9/2019 |
| CN | 209359016 U | 9/2019 |
| CN | 110291882 A | 10/2019 |
| CN | 110352693 A | 10/2019 |
| CN | 209609119 U | 11/2019 |
| CN | 110557981 A | 12/2019 |
| CN | 209749148 U | 12/2019 |
| CN | 209787751 U | 12/2019 |
| CN | 110679211 A | 1/2020 |
| CN | 209930839 U | 1/2020 |
| CN | 110810044 A | 2/2020 |
| CN | 210168414 U | 3/2020 |
| CN | 111010893 A | 4/2020 |
| CN | 210470200 U | 5/2020 |
| CN | 210580046 U | 5/2020 |
| CN | 109845430 B | 6/2020 |
| CN | 210726020 U | 6/2020 |
| CN | 210781975 U | 6/2020 |
| CN | 211047783 U | 7/2020 |
| CN | 211047784 U | 7/2020 |
| CN | 211152632 U | 8/2020 |
| CN | 211210519 U | 8/2020 |
| CN | 211240702 U | 8/2020 |
| CN | 111615871 A | 9/2020 |
| CN | 111623093 A | 9/2020 |
| CN | 211378812 U | 9/2020 |
| CN | 211457896 U | 9/2020 |
| CN | 105284209 B | 10/2020 |
| CN | 109077437 B | 11/2020 |
| CN | 216399524 U | 4/2022 |
| DE | 559014 C | 9/1932 |
| DE | 585827 C | 10/1933 |
| DE | 606258 C | 11/1934 |
| DE | 632687 C | 7/1936 |
| DE | 1024279 B | 2/1958 |
| DE | 1057371 B | 5/1959 |
| DE | 1837331 U | 9/1961 |
| DE | 2000740 A1 | 8/1971 |
| DE | 2145899 A1 | 3/1972 |
| DE | 2618842 A1 | 11/1977 |
| DE | 3043175 A1 | 10/1982 |
| DE | 3300134 A1 | 7/1983 |
| DE | 8332487 U1 | 6/1985 |
| DE | 8625564 U1 | 12/1986 |
| DE | 8712938 U1 | 12/1987 |
| DE | 3728061 C1 | 7/1988 |
| DE | 9000712 U1 | 3/1990 |
| DE | 9002359 U1 | 5/1990 |
| DE | 9201863 U1 | 6/1992 |
| DE | 9410781 U1 | 11/1994 |
| DE | 4229823 C2 | 5/1995 |
| DE | 4344571 A1 | 6/1995 |
| DE | 19506497 A1 | 10/1996 |
| DE | 29611986 U1 | 10/1996 |
| DE | 19627715 A1 | 4/1998 |
| DE | 19905175 C2 | 11/2000 |
| DE | 10330649 A1 | 1/2005 |
| DE | 102004028912 A1 | 1/2006 |
| DE | 102004041914 A1 | 3/2006 |
| DE | 102005021467 A1 | 11/2006 |
| DE | 202006012391 U1 | 11/2006 |
| DE | 202010003187 U1 | 6/2010 |
| DE | 102007054278 B3 | 7/2010 |
| DE | 202012103230 U1 | 12/2013 |
| DE | 102014010692 A1 | 1/2016 |
| DE | 102015005488 A1 | 11/2016 |
| DE | 202017106599 U1 | 12/2017 |
| DE | 102017126467 A1 | 5/2019 |
| DE | 202020002176 U1 | 7/2020 |
| DE | 202020002177 U1 | 8/2020 |
| EP | 0051175 A1 | 5/1982 |
| EP | 0118315 A2 | 9/1984 |
| EP | 0053839 B1 | 10/1985 |
| EP | 0140989 B1 | 6/1987 |
| EP | 0293675 B1 | 7/1990 |
| EP | 0260643 B1 | 11/1991 |
| EP | 0512784 A1 | 11/1992 |
| EP | 0636307 A1 | 2/1995 |
| EP | 0472102 B1 | 3/1995 |
| EP | 0916242 A2 | 5/1999 |
| EP | 0737415 B1 | 7/1999 |
| EP | 1013158 A1 | 6/2000 |
| EP | 1048193 A1 | 11/2000 |
| EP | 0885553 B1 | 8/2001 |
| EP | 0972436 B1 | 1/2005 |
| EP | 1714537 A1 | 10/2006 |
| EP | 1080618 B1 | 12/2008 |
| EP | 2033507 B1 | 7/2011 |
| EP | 1816265 B1 | 12/2012 |
| EP | 2602504 B1 | 5/2014 |
| EP | 2995186 B1 | 3/2018 |
| EP | 3014975 B1 | 5/2018 |
| EP | 2404491 B1 | 11/2018 |
| EP | 3586607 A1 | 1/2020 |
| EP | 3646756 A1 | 5/2020 |
| JP | 2006020627 A | 1/2006 |
| KR | 101795453 B1 | 12/2017 |
| KR | 1020210053070 A | 5/2021 |
| WO | WO8400465 A1 | 2/1984 |
| WO | WO8803746 A1 | 6/1988 |
| WO | WO9607306 A1 | 3/1996 |
| WO | WO0003583 A2 | 1/2000 |
| WO | WO03011009 A1 | 2/2003 |
| WO | WO2004010766 A1 | 2/2004 |
| WO | WO2005001207 A1 | 1/2005 |
| WO | WO2005043977 A2 | 5/2005 |
| WO | 2005110685 A2 | 11/2005 |
| WO | WO2006061928 A1 | 6/2006 |
| WO | WO2010087970 A1 | 8/2010 |
| WO | WO2010100758 A1 | 9/2010 |
| WO | WO2011035930 A1 | 3/2011 |
| WO | WO2012034355 A1 | 3/2012 |
| WO | WO2012070736 A1 | 5/2012 |
| WO | WO2013125912 A1 | 8/2013 |
| WO | WO2013187812 A1 | 12/2013 |
| WO | WO2014073013 A2 | 5/2014 |
| WO | WO2014119116 A1 | 8/2014 |
| WO | WO2014119174 A1 | 8/2014 |
| WO | WO2014119175 A1 | 8/2014 |
| WO | WO2014119181 A1 | 8/2014 |
| WO | WO2015064291 A1 | 5/2015 |
| WO | WO2015107731 A1 | 7/2015 |
| WO | WO2015137110 A1 | 9/2015 |
| WO | WO2016143161 A1 | 9/2016 |
| WO | WO2017006981 A1 | 1/2017 |
| WO | WO2017046046 A1 | 3/2017 |
| WO | WO2017056591 A1 | 4/2017 |
| WO | 2018057428 A1 | 3/2018 |
| WO | WO2018059713 A1 | 4/2018 |
| WO | WO2018068324 A1 | 4/2018 |
| WO | WO2018154147 A1 | 8/2018 |
| WO | WO2018176295 A1 | 10/2018 |

(56)         References Cited

FOREIGN PATENT DOCUMENTS

WO      WO2019154660  A1      8/2019
WO      WO2019174863  A1      9/2019
WO      WO2019185123  A1     10/2019
WO      WO2019192201  A1     10/2019
WO      WO2019196677  A1     10/2019
WO      WO2020065329  A1      4/2020

OTHER PUBLICATIONS

Makita, "XRU17PT 36V (18V x2) LXT® Brushless String Trimmer Kit (5.0Ah)," <https://www.makitatools.com/products/details/XRU17PT> web page visited May 2, 2022.
Makita, "XUX01M5PT 36V (18V x2) LXT® Brushless Couple Shaft Power Head Kit with String Trimmer Attachment (5.0Ah)," <https://www.makitatools.com/products/details/XUX01M5PT> web page visited May 2, 2022.
Makita, "Couple Shaft Power Head and Attachments, " <https://www.makitatools.com/ope/ope-shop/cordless-power-head> web page visited May 2, 2022.
Makita, "XUX01," Parts Breakdown, Rev. 0, Nov. 16, 2017 (6 pages).
Troy-Bilt, "Troy-Bilt Mini-Tiller," Owner/Operator Manual, © 1994 (24 pages).
International Search Report and Written Opinion for Application No. PCT/US2022/035776 dated Oct. 18, 2022 (11 pages).

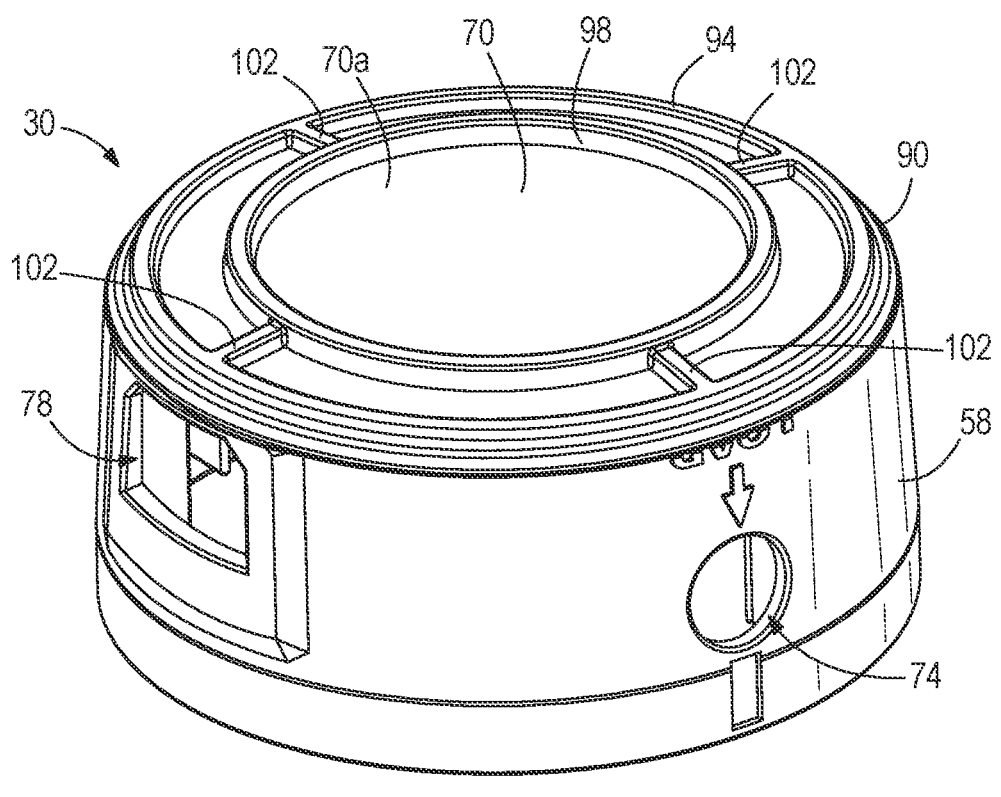
FIG. 5
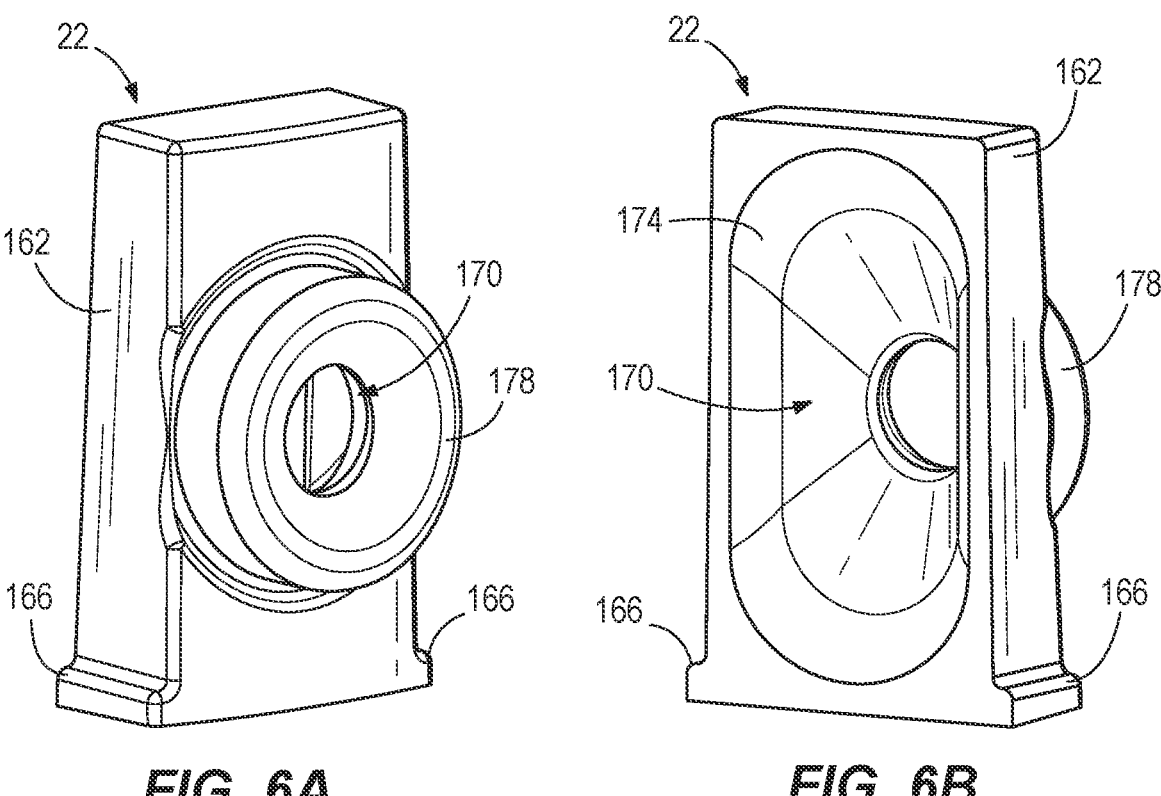
FIG. 6A                                  FIG. 6B

STRING TRIMMER HEAD

CROSS-REFERENCE TO RELATED APPLICATIONS

This application claims priority to U.S. Provisional Patent Application No. 63/241,197, filed Sep. 7, 2021, and U.S. Provisional Patent Application No. 63/216,817, filed Jun. 30, 2021, the entire contents of which are incorporated herein by reference.

FIELD

The present disclosure relates to trimmers and, more particularly, to a string trimmer head.

BACKGROUND

Generally, trimmers are used to cut grass and weeds and are often used to edge around trees, near fences and walls, and along landscape borders. Conventional string trimmers include an elongated shaft with a rotating element or head near the end of the elongated shaft, and a spool or string head is attached to a gear head. Typically, the string head includes a monofilament line (i.e., trimmer line) rotated by the head for cutting and trimming along landscaped areas, fences, walls, etc.

SUMMARY

In one independent aspect, a trimmer head for use with a string trimmer including a drive shaft includes a housing rotatable about a rotational axis, the housing including a main body defining a cavity, and a cap removably coupled to the main body, a spool supported in the cavity and operable to support line to be dispensed, a retainer positioned between the housing and the spool, and a nut positioned within the spool and configured to drivingly couple to the drive shaft.

In another independent aspect, a string trimmer includes a shaft, a handle positioned on the shaft and including a grip graspable by a user, a motor housing positioned on the shaft, a motor positioned within the motor housing and defining a drive shaft, and a trimmer head removably coupled to the drive shaft, the trimmer head including a housing defining a cavity and rotatable about a rotational axis, a spool supported in the cavity and operable to support line to be dispensed, and a nut insert molded into the spool and drivingly coupled to the drive shaft.

In another independent aspect, a trimmer head for use with a string trimmer including a drive shaft includes a housing rotatable about a rotational axis, the housing including a main body defining a cavity, and a cap defining a first surface and a second surface opposite the first surface, wherein the second surface includes a first plurality of teeth, a spool supported in the cavity and operable to support line to be dispensed, the spool is drivingly coupled to the drive shaft, wherein the spool includes a central portion extending along the axis, a first flange proximate one end of the central portion and including a second plurality of teeth, and a second flange proximate an opposite end of the central portion, and a retainer positioned between the housing and the spool, the retainer including a first surface having a third plurality of teeth configured to engage the first plurality of teeth, and a second surface having a fourth plurality of teeth configured to engage the second plurality of teeth.

Other independent aspects of the invention may become apparent by consideration of the detailed description, claims and accompanying drawings.

BRIEF DESCRIPTION OF THE DRAWINGS

FIG. 5 is a perspective view of a main body of the trimmer head of FIG. 1.

FIG. 6A is a perspective view of eyelets of the trimmer head of FIG. 1.

FIG. 6B is another perspective view of eyelets of the trimmer head of FIG. 1.

DETAILED DESCRIPTION

Before any independent embodiments of the disclosure are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Figure 1:
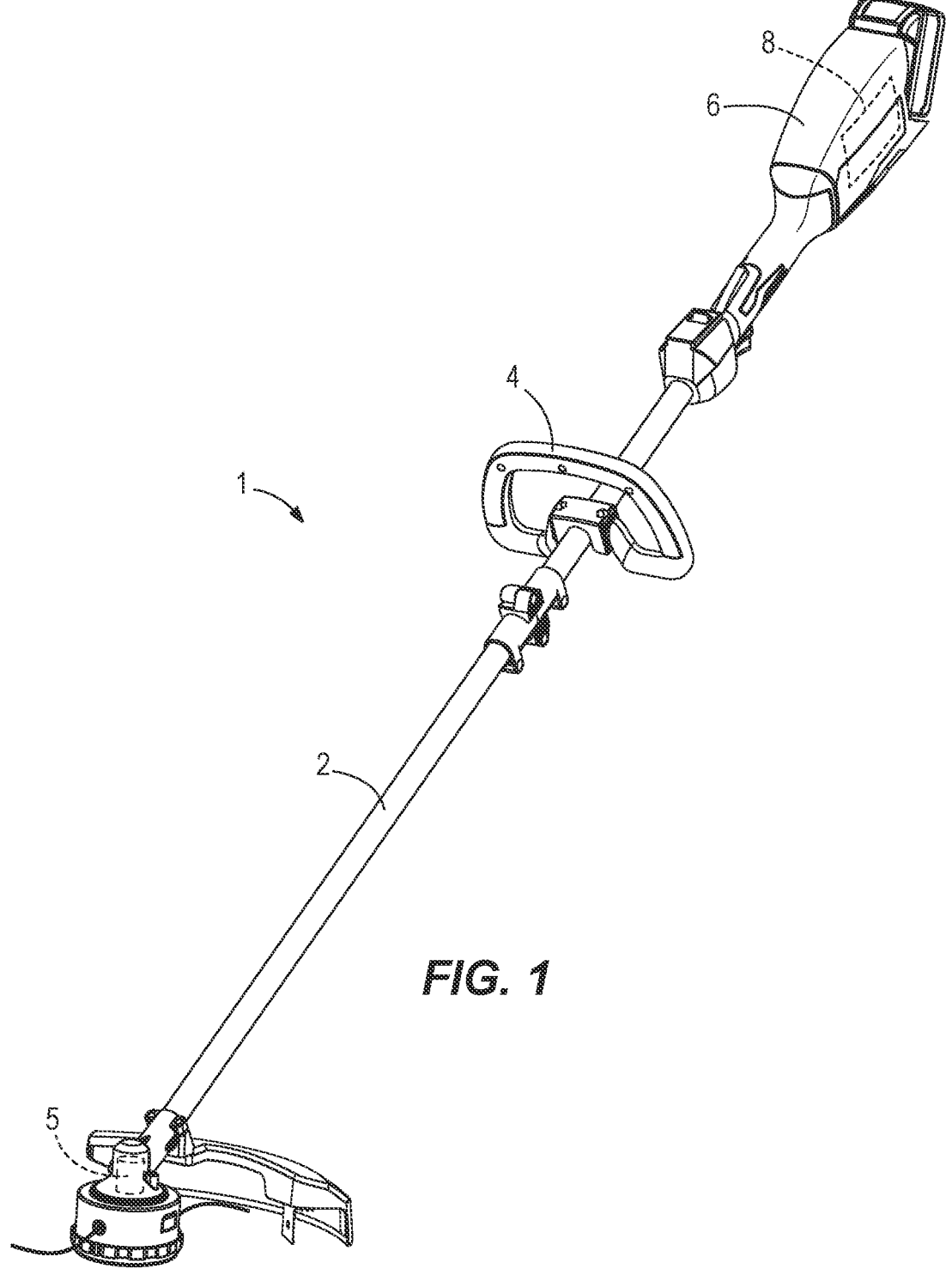
FIG. 1 is a perspective view of a string trimmer, according to embodiments disclosed herein.
Figure 2:
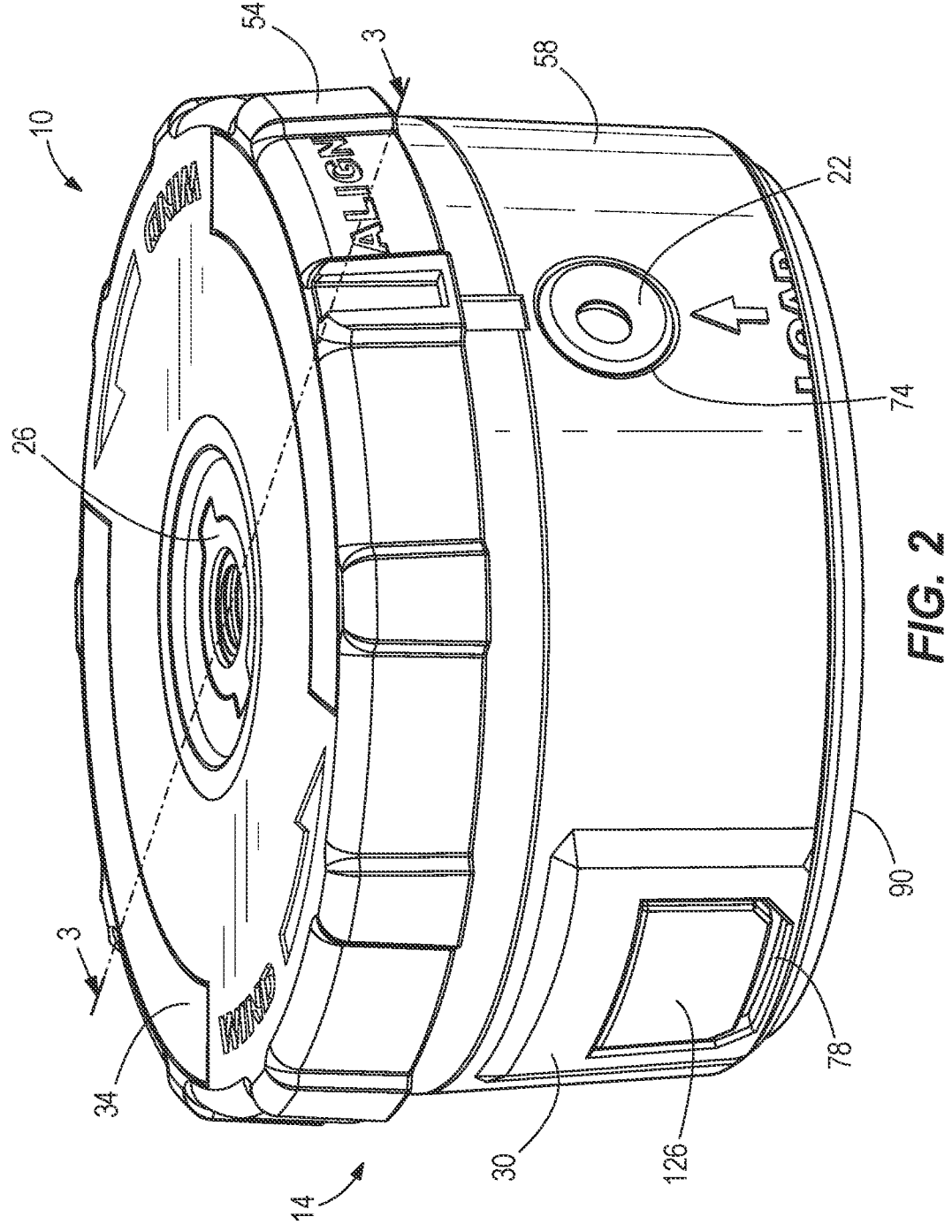
FIG. 2 is a perspective view of a trimmer head, according to embodiments disclosed herein.
Figure 3:
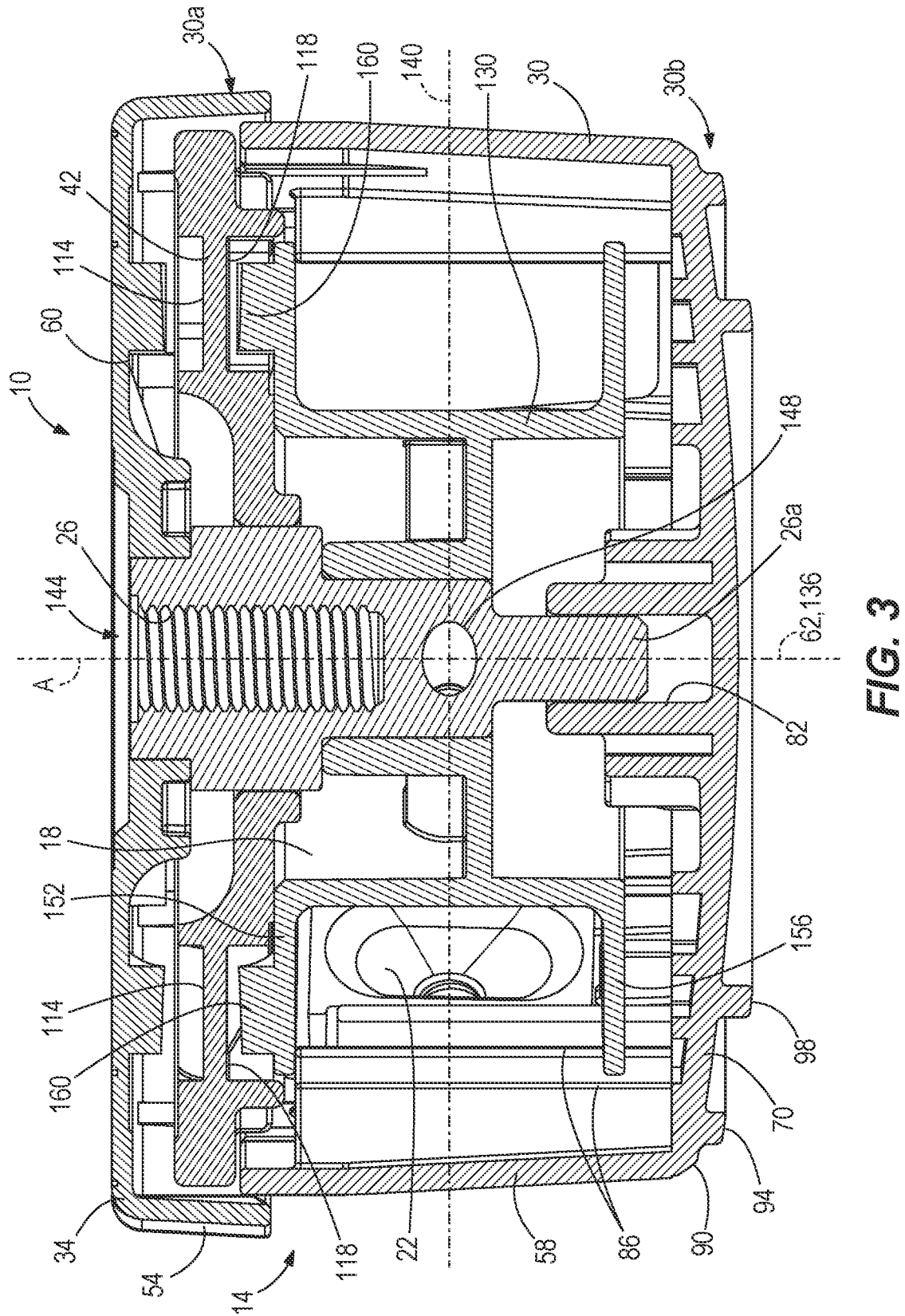
FIG. 3 is a cross-sectional view of the trimmer head of FIG. 1.
Figure 4:
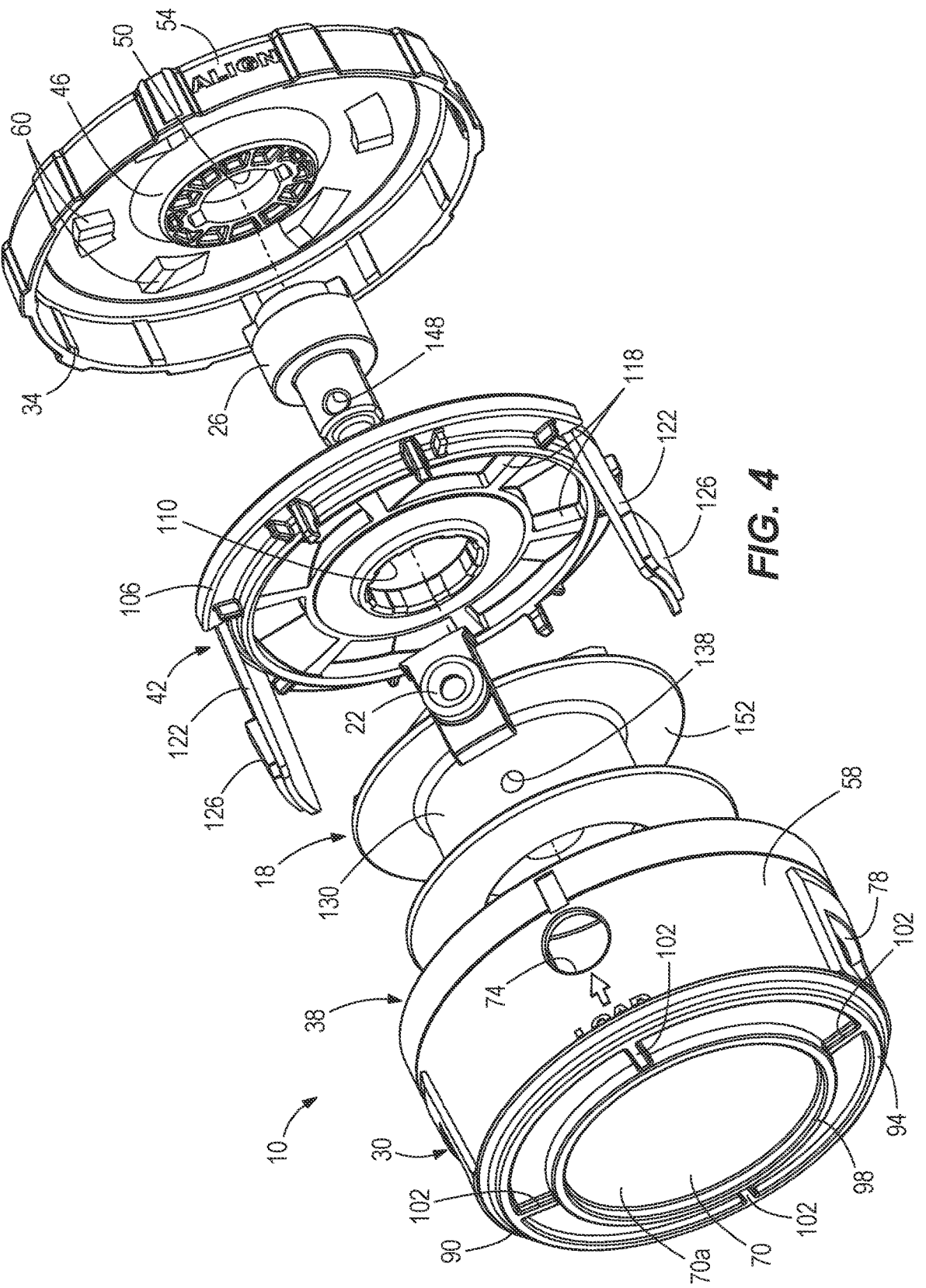
FIG. 4 is an exploded perspective view of the trimmer head of FIG. 1.

FIGS. 2-4 illustrate a string trimmer head 10 for use on an exemplary string trimmer 1 (FIG. 1). Such a trimmer 1 generally includes a shaft 2 with a handle 4 toward one end and a motor housing 6 enclosing an electric motor 8 with a motor-driven output, or drive shaft, 5 for connection to a trimmer head 10 on the other end. Various powered trimmers (e.g., battery-powered, gas-powered, etc.) may be used with the trimmer head 10.

As shown in FIGS. 2-4, the illustrated trimmer head 10 includes a housing 14 rotatable about an axis A and a spool 18 for retaining one or more lines. Line is wound around the spool 18 and extends through opposed eyelets 22 to cut vegetation (e.g., grass, weeds, etc.). In the illustrated embodiment, the trimmer head 10 is mounted to the trimmer drive shaft 5 via the spool 18. In other words, the spool 18 is drivingly connected to the drive shaft. In particular, a nut 26 configured to be drivingly connected to the drive shaft 5 may be insert molded into the spool 18. However, in some embodiments, the nut 26 may alternatively be secured to the spool 18 via alternative fastening methods (e.g., press-fit, slip-fit with retaining rings, etc.).

The housing 14 includes a main body 30 and a top plate, or cap, 34. The top plate 34 is spaced above the spool 18 and is keyed to the nut 26. The spool 18 and the top plate 34 are thus fixed to one other rotatably and axially via the nut 26. The main body 30 defines a cavity 38 for receiving the spool 18. A retainer ring 42 is positioned at the upper end of the main body 30. The retainer ring 42 is located on the nut 26 and is captured with axial and rotational play between the top plate 34 and an upper end of the spool 18. A spring is located at a lower end of the spool 18 to bias against a lower end of the housing 14.

With continued reference to FIG. 3, the nut 26 minimizes overall vibration within the trimmer head 10 during operation. As described above, various components of the housing 14 (e.g., the top plate 34, the spool 18, the retainer ring 42) are all coupled to the nut 26. As a result, the clearance between the housing components is minimized, thereby decreasing overall vibration in the trimmer head 10.

In the illustrated embodiment, the top plate 34 is generally cylindrical and includes a center boss 46 having an aperture 50 extending through the boss 46. The aperture 50 is shaped and sized to fixedly receive the nut 26. An outer rim 54 of the top plate 34 covers an end of a sidewall 58 of the main body 30 to enclose the cavity 38. A series of teeth 60 are positioned on an inner surface of the top plate 34 and are engageable with a corresponding series of teeth positioned on the retainer 42.

The main body 30 is generally cylindrical and includes a first end 30a, a second end 30b opposite the first end 30a, and a longitudinal axis 62 extending from the first end 30a to the second end 30b. The longitudinal axis 62 is collinear to the rotational axis A. The main body 30 additionally includes the sidewall 58 and a base wall 70. The sidewall 58 defines a pair of eyelet openings 74 and a pair of retainer openings 78. The eyelet openings 74 are shaped and sized to receive the eyelets 22, and the retainer openings 78 are shaped and sized to receive at least a portion of the retainer 42. An inner surface of the base wall 70 includes a center boss 82 and one or more ribs 86. The center boss 82 is shaped and sized to receive a portion of the nut 26. The ribs 86 axially extend from the base wall 70 and are configured to interface with the spool 18.

With reference to FIGS. 4-5, an edge 90 is formed on an outer surface of the main body 30 at a junction between the sidewall 58 and the base wall 70. More specifically, the edge 90 is generally chamfered. An outer surface 70a of the base wall 70 includes a first wear ring 94 and a second wear ring 98. The first and second wear rings 94, 98 are generally circular and protrude from the base wall 70. The wear rings 94, 98 are concentrically positioned on the base wall 70 relative to the longitudinal axis 62. More specifically, the first wear ring 94 includes a greater diameter than the second wear ring 98, such that the second wear ring 98 is positioned within the first wear ring 94. In some embodiments, the wear rings 94, 98 may include alternative shapes and sizes. For example, in some embodiments, at least one of the wear rings 94, 98 may include a rectangular shape. In such instances, the wear ring(s) 94, 98 may mate with a corresponding aperture and/or groove in a winding tool. More specifically, the winding tool may include a rectangular groove shaped and sized to receive at least one of the rectangular wear rings 94, 98. In order to turn the housing 14 (e.g., to wind line through the trimmer head 10), the user aligns the winding tool adjacent to the base wall 70 such that the wear rings(s) 94, 98 are positioned within the groove(s). Then, the user manually turns the tool relative to the trimmer head 10. As a result, because the wear ring(s) 94, 98 are engaged with the groove(s), the housing 14 turns in a direction opposite to a feed direction relative to the top plate 34, thereby winding line through the trimmer head 10 and onto the spool 18.

The outer surface 70a of the base wall 70 additionally includes ribs 102 protruding from the main body 30. The ribs 102 are positioned between the first wear ring 94 and the second wear ring 98 and are equidistantly spaced around the base wall 70 about the longitudinal axis 62. In the illustrated embodiments, the main body 30 includes four ribs 102. However, in alternative embodiments, the main body 30 may include fewer or additional ribs. The wear rings 94, 98 and chamfered edge 90 prevent damage to the housing 14 of the trimmer head 10, regardless of the angle at which the base wall 70 is oriented relative to the work surface, when the trimmer head 10 is bumped against a work surface.

With reference to FIGS. 3-4, the retainer 46 includes a ring 106 defining a central opening 110. The retainer 42 includes a first series of teeth 114 positioned on an upper surface of the ring 106, and a second series of teeth 118 positioned on a lower surface of the ring 106. The first series of teeth 114 are engageable with the teeth 60 positioned on the top plate 34 of the housing 14. Flexible retainer arms 122 extend from the ring 106, each having a retainer member 126 engageable in the associated retainer openings 78 to connect the main body 30 and the retainer 42.

With reference to FIGS. 3-4, the spool 18 includes a generally cylindrical, central body 130 including a through bore extending through the spool 18 along an axis 136 generally collinear to the longitudinal axis 62. An aperture 138 extends through the central body 130 for receiving line, such that the aperture 138 extends along an axis 140 substantially perpendicular to the longitudinal axis 62.

The through bore is shaped and sized to receive the nut 26. The nut 26 is positioned within the through bore and includes a threaded opening 144 shaped and sized to receive the shaft 5 of the string trimmer 1. In order to couple the trimmer head 10 to the shaft 5, the nut 26 is tightened around the drive shaft 5. A distal end 26a (FIG. 3) of the nut 26 protrudes through the spool 18 and is received within the central boss 82 of the main body 30 of the housing 14. The nut 26 additionally includes an aperture 148 that extends through the nut 26 along an axis generally perpendicular to the longitudinal axis 62. Specifically, the aperture 148 of the nut 26 aligns with the aperture 138 of the spool 18, thereby forming a passageway for line to be fed through the housing 14, the spool 18, and the nut 26.

The central body 130 of the spool 18 includes a first, upper flange 152 and a second, lower flange 156. The first and second flanges 152, 156 are arranged in parallel planes. In some embodiments, the spool 18 may include additional flanges. Teeth 160 are formed on the upper flange 152 and are selectively engageable with the second series of teeth 118 on the retainer 42.

As discussed above, the spring is located at the lower end of the spool 18 to bias against the housing 14. In the biased position, the retainer 42 and housing 14 are biased downwardly by the spring and the spool 18 is drivingly connected to the housing 14 via the second series of teeth 118 located on the lower surface of the retainer 42 cooperating with the teeth 160 on the upper flange 152 of the spool 18.

With reference to FIGS. 6A-6B, each eyelet 22 includes a body 162 received in a pocket of the main body 30 and includes ears 166 limiting movement into the pocket. A passage 170 is defined through each eyelet 22. An inner portion 174 of the passage 170 has a first shape (e.g., an oval shape, as illustrated) with a length generally along the axis A greater than its width. The passage 170 transitions to an outer portion having a second shape (e.g., a circular shape) provided in a projection 178 (e.g., a cylindrical projection) received in the eyelet opening 74 of the main body 30. In other embodiments, the inner portion 174 of the passage 170 has an alternative shape with similar dimensions (e.g., a length generally along the axis A greater than its width, such as, for example, a rectangular shape). Similarly, the outer portion provided in the projection 178 may have an alternative shape, such that at least its length generally along the axis A (and, potentially, its width) is less than a length (and, potentially, a width) of the passage 170.

To assemble the trimmer head 10, the central body 130 of the spool 18 is coupled to the retainer 42. Specifically, the retainer 42 is captured between the top plate 34 and the spool 18. The eyelets 22 are received in the eyelet pockets, with each outer projection 178 extending through the eyelet openings 74. The retainer 42 is then snap-fit to the main body 30, with the retainer arms 122 biasing each retainer member 126 into a retainer opening 78. The spool 18 is thus captured between the main body 30 and the retainer 46, and the trimmer head 10 is assembled as a unit.

To install line, an end of a single line is fed through the passageway in one eyelet 22, into and through the aperture 138 of the spool 18 and the aperture 148 of the nut 26. The end of the line is then fed through the passageway in the other eyelet 22, such that an equal amount of line extends from each eyelet 22. The line is centered and then wound onto the spool 18 (e.g., by turning the housing 14 in a direction opposite to a feed direction while holding the top plate 34) until sufficient line extends from each eyelet 22.

In operation, the trimmer 1 is operated to rotate the drive shaft 5 and, thereby, the spool 18. As mentioned above, in the biased, initial position, the housing 14 and the retainer 42 are biased downwardly via the biasing spring, and the spool 18 is drivingly connected to the housing 14 via the plurality of cooperating teeth 118, 160 located on the retainer 42 and the top end of the spool 18. As a result, the trimmer 1 can be operated to rotate the drive shaft 5, thereby rotating the spool 18 (along with the housing 14 and the retainer 42) and the cutting line so that the line may cut vegetation.

As the trimmer head 10 is being operated, the head 10 may be "bumped" against the work surface, for example, to dispense additional cutting line.

The housing 14 and the retainer 42 move axially on the insert molded nut 18 against the spring bias to disengage the cooperating interfaces (e.g., teeth 160, 118) on the top of the spool 18 and the bottom of the retainer 42. With these cooperating interfaces 160, 118 disengaged, the housing 14 is free to rotate relative to the spool 18 to dispense additional line. The housing 14 may be depressed until the retainer 42 engages the top plate 34. At this time, a plurality of cooperating interfaces (e.g., ramps, or teeth, 114 formed on the bottom of the top plate 34 and ramps, or teeth, 60 formed on the top of the retainer 42) engage with one another to momentarily drivingly connect the housing 14 with the spool 18. Once the housing 14 disengages the surface, the spring biases the housing 14 and the retainer 42 downwardly into the biased position. As the cooperating interfaces 114, 60 on the bottom of the top plate 34 and the top of the retainer 42 are disengaged, the housing 14 is again free to rotate relative to the spool 18 to dispense additional line until the cooperating interfaces 160, 118 on the top of the spool 18 and the bottom of the retainer 42 become engaged in the biased position. Because the wear rings 94, 98 are positioned on the bottom of the base wall 70 of the main body 30, the wear rings 94, 98 contact the work surface rather than the base wall 70. Therefore, the housing 14 is protected from wear against the ground.

Although aspects of the invention have been described in detail with reference to certain preferred constructions, variations and modifications exist within the scope and spirit of one or more independent aspects of the invention as described.

What is claimed is:

1. A trimmer head for use with a string trimmer including a drive shaft, the trimmer head comprising:

a housing rotatable about a rotational axis, the housing including a main body defining a cavity, and a cap removably coupled to the main body;

a spool supported in the cavity and operable to support line to be dispensed;

a retainer positioned between the cap of the housing and the spool, the retainer including a ring, a first series of teeth extending from an upper surface of the ring towards the cap, and a second series of teeth extending from a lower surface of the ring towards the spool; and a nut positioned within the spool and configured to drivingly couple to the drive shaft.

2. The trimmer head of claim 1, wherein the cap is keyed to the nut.

3. The trimmer head of claim 2, wherein the spool is rotationally and axially fixed to the cap via the nut.

4. The trimmer head of claim 1, wherein the nut protrudes through the spool and is received within a central boss of the housing.

5. The trimmer head of claim 1, wherein the nut includes a first aperture and the spool includes a second aperture, wherein the first aperture and the second aperture at least partially define a passageway for a line to be fed through the trimmer head.

6. The trimmer head of claim 1, wherein the nut is threadably coupled to the drive shaft.

7. The trimmer head of claim 1, further comprising a biasing member supported in the cavity adjacent the spool.

8. The trimmer head of claim 1, wherein a first plurality of gaps are defined between the first series of teeth and a second plurality of gaps are defined between the second series of teeth, and wherein the first plurality of gaps are configured to receive a first plurality of teeth extending from the cap and the second plurality of gaps are configured to receive a second plurality of teeth extending from the spool.

9. A string trimmer comprising:

a shaft;

a handle positioned on the shaft and including a grip graspable by a user;

a motor housing positioned on the shaft;

a motor positioned within the motor housing and defining a drive shaft; and a trimmer head removably coupled to the drive shaft, the trimmer head including a housing including a main body and a cap defining a cavity and rotatable about a rotational axis, a spool supported in the cavity and operable to support line to be dispensed, a retainer positioned between the cap of the housing and the spool, the retainer including a ring, a first series of teeth extending from an upper surface of the ring towards the cap, and a second series of teeth extending from a lower surface of the ring towards the spool, and a nut positioned within the spool and drivingly coupled to the drive shaft.

10. The string trimmer of claim 9, wherein the trimmer head includes a biasing member supported in the cavity adjacent the spool.

11. The string trimmer of claim 9, wherein the housing includes a main body defining the cavity, and the cap is removably coupled to the main body.

12. The string trimmer of claim 11, wherein the cap is keyed to the nut, and wherein the spool is rotationally and axially fixed to the cap via the nut.

13. The string trimmer of claim 9, wherein the nut protrudes through the spool and is received within a central boss of the housing.

14. The string trimmer of claim 9, wherein the nut includes a first aperture and the spool includes a second aperture, wherein the first aperture and the second aperture at least partially define a passageway for a line to be fed through the trimmer head.

15. A trimmer head for use with a string trimmer including a drive shaft, the trimmer head comprising:

a housing rotatable about a rotational axis, the housing including:

a main body defining a cavity, and a cap defining a first surface and a second surface opposite the first surface, wherein the second surface includes a first plurality of teeth;

a spool supported in the cavity and operable to support line to be dispensed, the spool is drivingly coupled to the drive shaft, wherein the spool includes:

a central portion extending along the rotational axis, a first flange proximate one end of the central portion and including a second plurality of teeth, and a second flange proximate an opposite end of the central portion; and a retainer positioned between the housing and the spool, the retainer including a ring, a first series of teeth extending from an upper surface of the ring towards the cap, and a second series of teeth extending from a lower surface of the ring towards the spool.

16. The trimmer head of claim 15, further comprising a nut insert molded into the spool, wherein the nut is drivingly coupled to the drive shaft.

17. The trimmer head of claim 15, further comprising a biasing member supported in the cavity and positioned adjacent to the second flange of the spool, wherein the biasing member is configured to bias the spool into engagement with the retainer.

18. The trimmer head of claim 17, wherein when the spool is biased into engagement with the retainer, the second plurality of teeth on the spool engage gaps defined between the second series of teeth of the retainer.

19. The trimmer head of claim 17, wherein when the spool is biased out of engagement with the retainer, the first plurality of teeth on the cap engage gaps defined between the first series of teeth of the retainer.

\* \* \* \* \*